United States Patent
Strom et al.

(10) Patent No.: US 12,001,524 B2
(45) Date of Patent: *Jun. 4, 2024

(54) ENTERPRISE APPLICATION MANAGEMENT WITH ENROLLMENT TOKENS

(71) Applicant: Microsoft Technology Licensing, LLC, Redmond, WA (US)

(72) Inventors: Clifford Paul Strom, Sammamish, WA (US); Daniel Kevin McBride, Redmond, WA (US); Arvind Ramakrishnan, Bellevue, WA (US); Yashraj Motilal Borse, Redmond, WA (US); Chittaranjan Pattekar, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,396

(22) Filed: Jul. 29, 2022

(65) Prior Publication Data

US 2022/0366018 A1 Nov. 17, 2022

Related U.S. Application Data

(63) Continuation of application No. 15/635,183, filed on Jun. 27, 2017, now Pat. No. 11,429,696, which is a
(Continued)

(51) Int. Cl.
*G06F 21/12* (2013.01)
*G06F 21/62* (2013.01)
(Continued)

(52) U.S. Cl.
CPC .......... *G06F 21/12* (2013.01); *G06F 21/6281* (2013.01); *G06F 21/645* (2013.01);
(Continued)

(58) Field of Classification Search
None
See application file for complete search history.

(56) References Cited

U.S. PATENT DOCUMENTS

| 7,747,851 B1 * | 6/2010 | Robinson | H04L 9/3265 |
| | | | 726/29 |
| 8,108,536 B1 * | 1/2012 | Hernacki | G06F 21/57 |
| | | | 709/224 |

(Continued)

*Primary Examiner* — Benjamin E Lanier
(74) *Attorney, Agent, or Firm* — Barta Jones, PLLC

(57) ABSTRACT

Embodiments of the disclosure provide application management capabilities to enterprises. A computing device of a user, associated with the enterprise, receives an enrollment token signed with a certificate. The enrollment token includes an enterprise identifier associated with the enterprise. The computing device receives a package containing one or more applications. The package also includes an enterprise identifier. Installation and execution of one or more applications from the received package is accepted or rejected based on a comparison of the enterprise identifier from the enrollment token with the enterprise identifier from the received package or application. A web service provides validation services by monitoring the installation and execution of applications on the computing devices associated with the enterprise.

20 Claims, 15 Drawing Sheets

Related U.S. Application Data continuation of application No. 13/831,849, filed on Mar. 15, 2013, now Pat. No. 9,754,089.

(51) Int. Cl.
*G06F 21/64* (2013.01)
*G06F 8/61* (2018.01)
*G06F 21/00* (2013.01)
*G06F 21/10* (2013.01)
*G06F 21/16* (2013.01)

(52) U.S. Cl.
CPC ............. *G06F 8/61* (2013.01); *G06F 21/00* (2013.01); *G06F 21/1064* (2023.08); *G06F 21/16* (2013.01)

(56) References Cited

U.S. PATENT DOCUMENTS

| | | | | |
|---|---|---|---|---|
| 8,229,858 | B1* | 7/2012 | Mazza | H04L 63/10 |
| | | | | 705/902 |
| 8,473,749 | B1* | 6/2013 | Madsen | H04W 12/35 |
| | | | | 726/28 |
| 8,719,908 | B1* | 5/2014 | Boniface | H04L 63/0823 |
| | | | | 726/10 |
| 11,429,696 | B2* | 8/2022 | Strom | G06F 21/645 |
| 2003/0056094 | A1* | 3/2003 | Huitema | H04L 63/04 |
| | | | | 713/157 |
| 2005/0004873 | A1* | 1/2005 | Pou | G06F 21/10 |
| | | | | 705/51 |
| 2012/0084184 | A1* | 4/2012 | Raleigh | H04W 48/16 |
| | | | | 709/224 |
| 2013/0055345 | A1* | 2/2013 | Belchee | G06F 21/6218 |
| | | | | 726/3 |

* cited by examiner

ENTERPRISE APPLICATION MANAGEMENT WITH ENROLLMENT TOKENS

CROSS REFERENCE TO RELATED APPLICATIONS

This application is a continuation of and claims priority to U.S. application Ser. No. 15/635,183 entitled ""ENTERPRISE APPLICATION MANAGEMENT WITH ENROLLMENT TOKENS," filed Jun. 27, 2017 which is a continuation of and claims priority to U.S. application Ser. No. 13/831,849 (now U.S. Pat. No. 9,754,089), entitled "ENTERPRISE APPLICATION MANAGEMENT WITH ENROLLMENT TOKENS," filed Mar. 15, 2013, which is incorporated herein in its entirety.

BACKGROUND

Application developers make their applications available through existing application marketplaces. While users can download the applications from the application marketplaces to their devices, support for enterprise management of the devices and applications is limited. For example, some of the existing systems require third-party software to be installed on each of the user devices, thus compromising platform security and possibly allowing piracy by rogue enterprises or rogue users. Further, some the existing systems require frequent interaction with the user to browse, select, download, install, and execute the applications on the user devices.

SUMMARY

Embodiments of the disclosure receive, by a computing device, a token signed with a certificate. The token includes an enterprise identifier associated with an enterprise. The computing device receives a package containing one or more applications. The package also includes an enterprise identifier. The enterprise identifier from the token is compared with the enterprise identifier from the package. Based on the comparison, the computing device accepts or rejects installation of the one or more applications from the received package.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
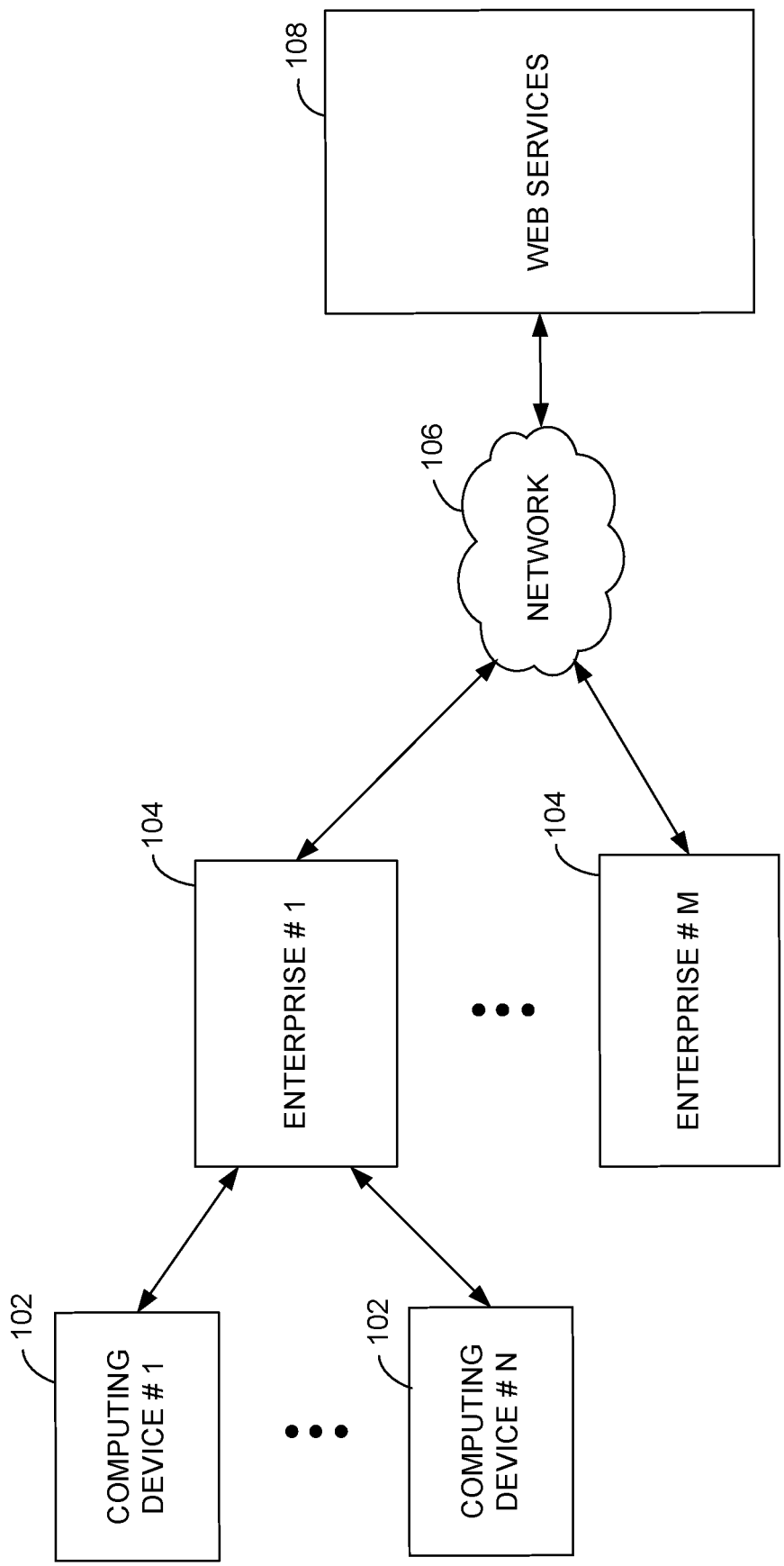
FIG. 1 is an exemplary block diagram illustrating a system for managing execution of applications by a computing device associated with an enterprise.

Referring to the figures, embodiments of the disclosure enable an enterprise 104 to manage application execution and/or installation with enrollment tokens. In some embodiments, the enterprise 104 registers with a web service 108 that provides the enrollment token to the enterprise 104. The web service 108 may also provide applications to the enterprise 104 that the enterprise 104 can manage. The enterprise 104 distributes the enrollment token to one or more of the computing devices 102 associated with the enterprise 104. Thus, the applications are managed by the enterprise 104 rather than another entity, such as the web service 108. In some embodiments, the web service 108 controls an account state of the enterprise 104 and monitors whether the enterprise 104 and/or its associated computing devices 102 are operating properly (e.g., in accordance with an account associated with the enterprise 104).

Aspects of the disclosure further enable the enterprises 104 to operate independently without any third party application software installation. For example, the computing devices 102 install the application without downloading the application from an application hub 212. Rather, the enterprise 104 provides the application to the computing devices 102 enrolled with the enterprise 104. The enterprise 104 can thus control distribution of the application by distributing an enrollment token to only those computing devices 102 that the enterprise 104 wants to have access to the application. Thus, only the enrolled computing devices 102 are allowed to install and execute the application. In this way, a secured distribution of applications via the enterprises 104 is enabled, in contrast with distribution of the applications via an application marketplace. In some embodiments, the web service 108 may disable or revoke access to one or more of the computing devices 102, one or more of the applications, and/or the enterprise 104 as a whole.

Referring again to FIG. 1, an exemplary block diagram illustrates a system for installation and/or execution of applications by one or more of the computing devices 102 associated with one or more of the enterprises 104. In the example of FIG. 1, the computing devices 102 include computing device #1 through computing device #N, and the enterprises 104 include enterprise #1 through enterprise #M. The enterprises 104 communicate with one or more of the web service 108 via a network. The network 106 supports any quantity and type of wireless and/or wired communication modes including cellular division multiple access (CDMA) including 3G CDMA2000 EV-DO, Global System for Mobile Communication (GSM) including 2G GSM, 2.5G GPRS, 2.75G EDGE and 3G WCDMA, wireless fidelity (Wi-Fi), 4G LTE and Wi-Max, 4G+ LTE Advanced, and the like.

In general, the enterprise 104 manages any group, collection, or association of the computing devices 102, such as devices associated with a company, location, facility, family, friends, and the like. For example, the enterprise 104 represents the devices associated with a user 304, such as a tablet, mobile telephone, gaming console, laptop, etc. Each of the computing devices 102 may be enrolled with more than one of the enterprises 104. The computing devices 102 and enterprises 104 operate in an application ecosystem, such as next described with reference to FIG. 2.

The web services 108 include any quantity of web services. In some embodiments, one or more of the web services 108 may be owned, operated, managed, or otherwise controlled by the enterprise 104, while other of the web services 108 are not. For example, the web services 108 may include at least one validation service that is not "owned" by any of the enterprises 104. Exemplary operation of the validation service is described below with reference to FIG. 13.

Figure 2:
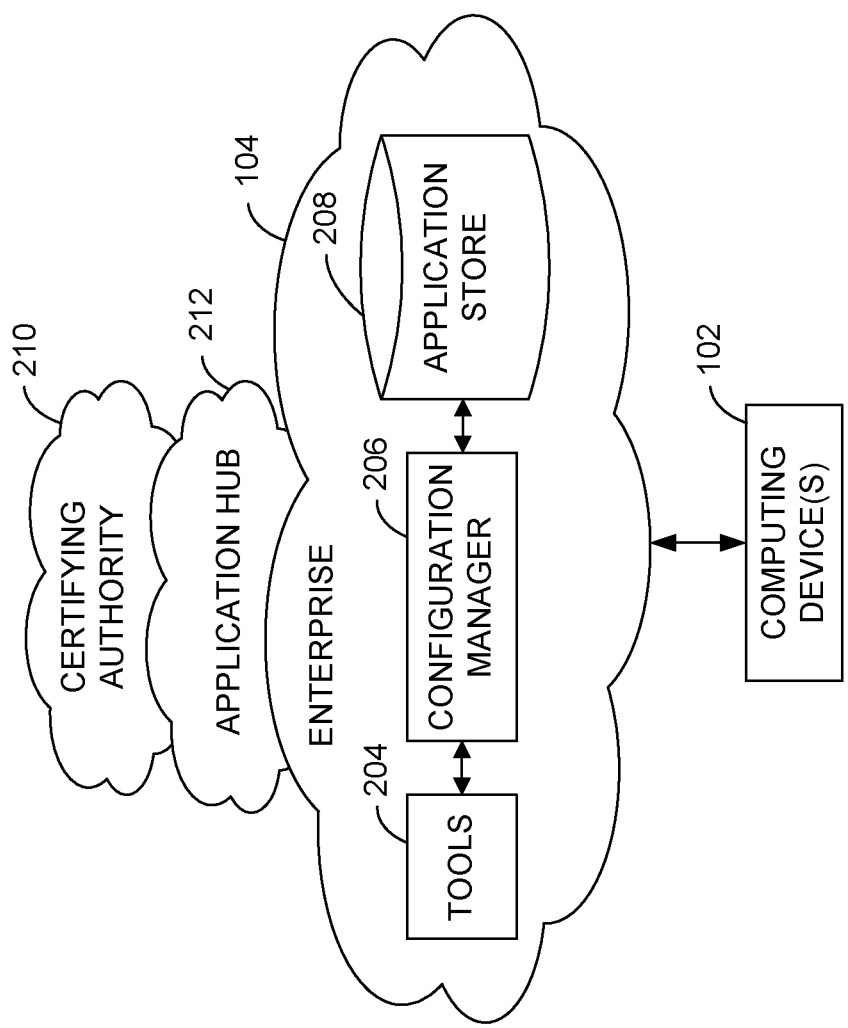
FIG. 2 is an exemplary block diagram illustrating an exemplary architecture showing computing device(s) associated with the enterprise, an application hub, and a certifying authority.

Referring next to FIG. 2, an exemplary architecture shows computing device(s) 102 associated with the enterprise 104, the application hub 212, and a certifying authority 210. An application ecosystem includes, for example, the enterprise 104 and the computing devices 102 associated with the enterprise 104. In the example of FIG. 2, the enterprise 104 includes tools 204, a configuration manager 206, and an application store 208 to store the applications. The tools 204 are used by the enterprise 104 to manage applications on the computing devices 102 associated with the enterprise. The configuration manager 206 maintains configuration of the computing devices 102 and the applications that are allowed to be installed and executed on the computing devices 102. The application store 208 locally stores the applications from the web service 108. The application store 208 provides the applications to the computing device 102 based on request from the computing device 102, in some embodiments.

In operation, the enterprise 104 requests account registration with the application hub 212. The application hub 212 enrolls one or more of the computing devices 102 associated with the enterprise 104 as eligible to install and execute the applications. In some embodiments, the enrollment of the computing devices 102 associated with the enterprise 104 is performed one time only. After enrollment of the computing devices 102, each application is signed and stored in the application store 208. The computing devices 102, which are enrolled, may install and launch the applications. In some embodiments, the applications on the enterprise 104 are not submitted by the application hub 212 to an application marketplace for consumption by other devices. In this manner, the enterprise 104 may distribute customized applications developed for consumption by the computing devices 102 associated with the enterprise 104.

In some embodiments, the applications and their associated data in the enterprise 104 are distinct from application marketplace (e.g., public) applications and their associated data. Thus, during installation and/or launch of the enterprise applications, aspects of the disclosure confirm that the computing device 102 is enrolled with the associated enterprise 104. Further, the application and associated data is removed from the computing device 102 during un-enrollment of the computing device 102 from the enterprise 104. As such, the enterprise 104 is responsible for the quality of the applications and overall experience on the computing devices 102.

In some embodiments, there are multiple application hubs 212 each providing different enrollment tokens to the enterprise 104 registering with them.

Further, the web service 108 may be hosted on one of the application hubs 212. In another embodiment, the web service 108 may be hosted on a server computing device distinct from the application hub 212.

An exemplary architecture for the computing device 102 is next described.

Figure 3:
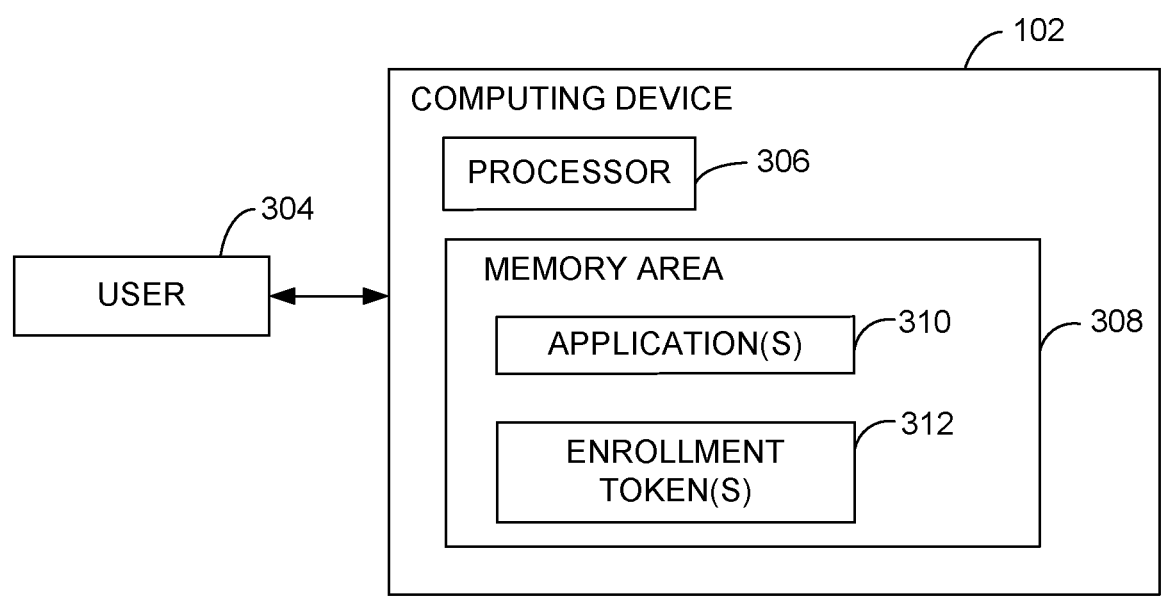
FIG. 3 is an exemplary block diagram illustrating configuration of the computing device.

Referring next to FIG. 3, an exemplary block diagram illustrates the computing device 102 as having at least one processor 306 and a memory area 308. In the example of FIG. 3, the computing device 102 represents any device executing instructions (e.g., as application programs, operating system functionality, or both) to implement the operations and functionality described and/or illustrated herein. The computing device 102 may include a mobile computing device 102 or any other portable device. In some embodiments, the mobile computing device 102 includes a mobile telephone, laptop, tablet, computing pad, netbook, gaming device, wearable computing device (such as in watch or glasses form factors), and/or portable media player. The computing device 102 may also include less portable devices such as desktop personal computers, kiosks, tabletop devices, industrial control devices, wireless charging stations, and electric automobile charging stations. Additionally, the computing device 102 may represent a group of processing units or other computing devices.

The processor 306 includes any quantity of processing units, and is programmed to execute computer-executable instructions for implementing aspects of the disclosure. The instructions may be performed by the processor 306 or by multiple processors executing within the computing device 102, or performed by a processor external to the computing device 102. In some embodiments, the processor 306 is programmed to execute at least some of the instructions illustrated in the figures (e.g., FIGS. 4, 5, and 7).

In some embodiments, the processor 306 represents an implementation of analog techniques to perform the operations described herein. For example, the operations may be performed by an analog computing device and/or a digital computing device.

The computing device 102 further has one or more computer readable media such as the memory area 308. The memory area 308 includes any quantity of media associated with or accessible by the computing device 102. The memory area 308 may be internal to the computing device 102 (as shown in FIG. 3), external to the computing device 102 (not shown), or both (not shown). In some embodiments, the memory area 308 includes read-only memory and/or memory wired into an analog computing device.

The memory area 308 stores, among other data, one or more applications 310. The applications 310, when executed by the processor 306, operate to perform functionality on the computing device 102. Exemplary applications include mail application programs, web browsers, calendar application programs, address book application programs, messaging programs, media applications, location-based services, search programs, game applications, and the like.

Each application 310 stored in the memory area 308 has an enterprise identifier associated therewith. In some embodiments, the same enterprise identifier is associated with multiple applications. In another embodiment, at least one of the applications 310 has a first enterprise identifier associated therewith and at least one of the other applications 310 has a second enterprise identifier associated therewith.

The memory area 308 further stores enrollment tokens 312 signed with a certificate. In some embodiments, one enrollment token 312 is associated with each of the applications 310. In other embodiments, different enrollment tokens 312 are associated with different applications 310. In some embodiments, each enrollment token 312 is an extensible markup language (XML) document signed with the certificate. The enrollment token 312 may be signed by the certifying authority 210. The enrollment token 312 includes the enterprise identifier associated with the enterprise 104.

The certificate represents certification by a third party (e.g., the certifying authority 210) that the enterprise 104 is a valid entity. In some embodiments, the enrollment token 312 also includes an enterprise policy, an expiration date, a location identifier, a device identifier, and/or a user identifier. In some embodiments, when the certificate associated with the enrollment token 312 expires, the enrollment token 312 also expires.

In operation, the processor 306 is programmed to receive a package containing the application. The enterprise identifier associated with the application in the received package is compared with the enterprise identifier associated with the enrollment token 312 stored in the memory area 308. Based on the comparison, the application in the received package is installed on the computing device 102, as described further below with reference to FIG. 5.

The processor 306 is further programmed to receive a request from the user 304 of the computing device 102 to execute one of the applications 310 stored in the memory area 308. The enterprise identifier associated with the application 310 is compared with the enterprise identifier associated with the enrollment token 312 stored in the memory area 308. Based on the comparison, the application is executed, as described further below with reference to FIG. 7.

In some embodiments, the enrollment token 312 stored in the memory area 308 is validated with the web service 108. The validation of the enrollment token 312 may be performed periodically and/or intermittently. In some embodiments, validation of the enrollment token 312 may be performed after a user request to execute the application 310, but before execution of the application 310.

Figure 4:
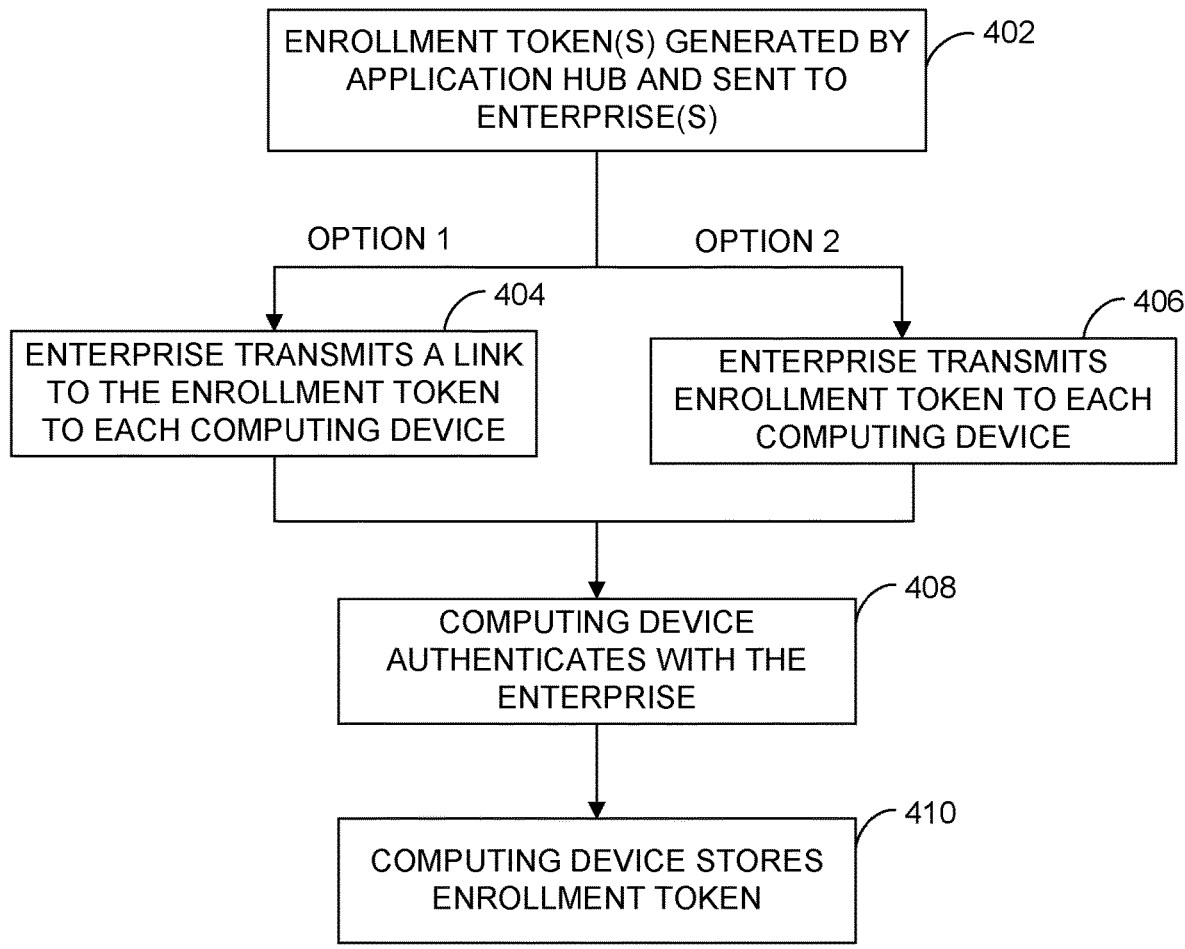
FIG. 4 is an exemplary flow chart illustrating enrollment of the computing device by an enrollment token.

Referring next to FIG. 4, an exemplary flow chart illustrates enrollment of the computing device 102. At 402, enrollment tokens are generated by the application hub 212 and sent to the enterprise 104. For example, the enrollment tokens may be generated per application or one enrollment token may be generated for a group of applications. In some embodiments, one enrollment token may be generated for all applications on the enterprise 104. In such a scenario, the enterprise 104 has one enrollment token overall. In one example (Option 1) at 404, the enterprise 104 transmits a link to the enrollment token to the computing device 102. In another example (Option 2) at 406, the enterprise 104 transmits the enrollment token itself to the computing device 102. In both examples, the link to the enrollment token or the enrollment token may be sent by an enterprise email server to the computing devices 102 as link or as attachment. Other modes of distributing the token are within scope of the disclosure.

In response to receiving the enrollment token, at 408, the computing device 102 authenticates with the enterprise 104. Authenticating includes, for example, presenting credentials to the enterprise 104. After successfully authenticating with the enterprise 104, at 410, the computing device 102 stores the enrollment token 312. After storing the enrollment token 312, the computing device 102 is now enrolled with the enterprise 104.

In some embodiments, the enterprise identifier from the received token is validated before storing the token. Alternatively or in addition, the enterprise identifier from the received token is validated before installing applications associated with the enterprise.

Figure 5:
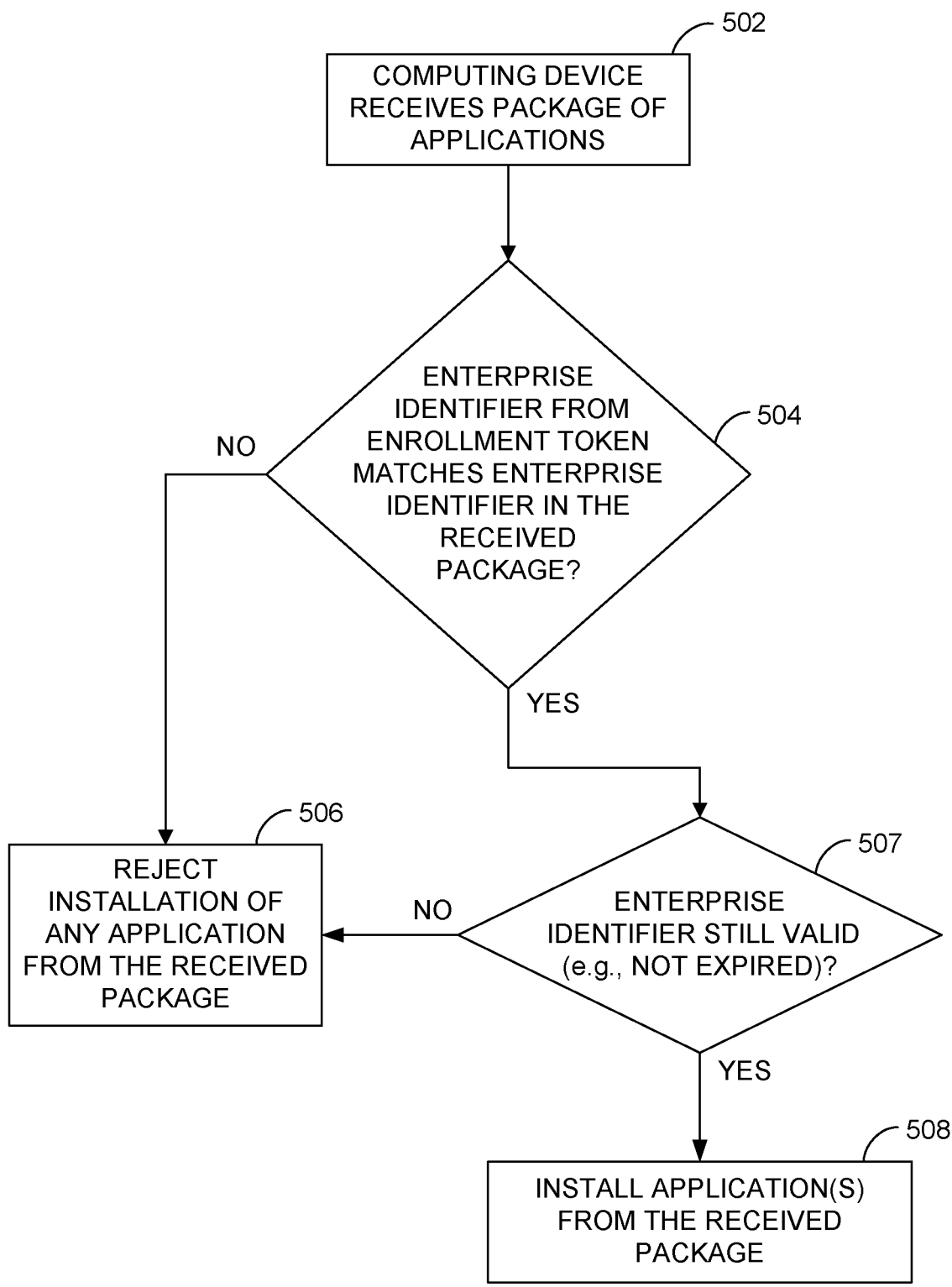
FIG. 5 is an exemplary flow chart illustrating operations for application installation by the computing device.

Referring next to FIG. 5, an exemplary flow chart illustrates operations for application installation by the computing device 102. At 502, the computing device 102 receives a package of applications. The package, in some embodiments, is received based on a user request to install one or more of the applications. Alternatively or in addition, the package containing one or more applications is received by the computing device 102 based on a location of the computing device 102. For example, if the computing device 102 is near to a theatre, a package containing a ticket booking application may be received by the computing device 102.

At 504, the enterprise identifier stored in the enrollment token 312 stored in the computing device 102 is compared to the enterprise identifier in the received package. For example, a plurality of enrollment tokens 312 stored by the computing device 102 is searched for an enrollment token having the enterprise identifier that matches the enterprise identifier from the received package. The computing device 102 accepts or rejects installation of the applications in the received package based on the comparison. If the enterprise identifiers do not match, at 506, installation of any application from the received package is rejected. For example, rejecting installation of the received package includes preventing installation of any of the applications if the enterprise identifier from the enrollment token 312 fails to match the enterprise identifier from the package.

If the enterprise identifier is no longer valid (e.g., the certificate has expired) at 507, installation of any application from the received package is rejected. Otherwise, if the enterprise identifiers match and are still valid, at 508, installation of the received package is accepted by installing one or more applications from the received package on the computing device 102.

Figure 6:
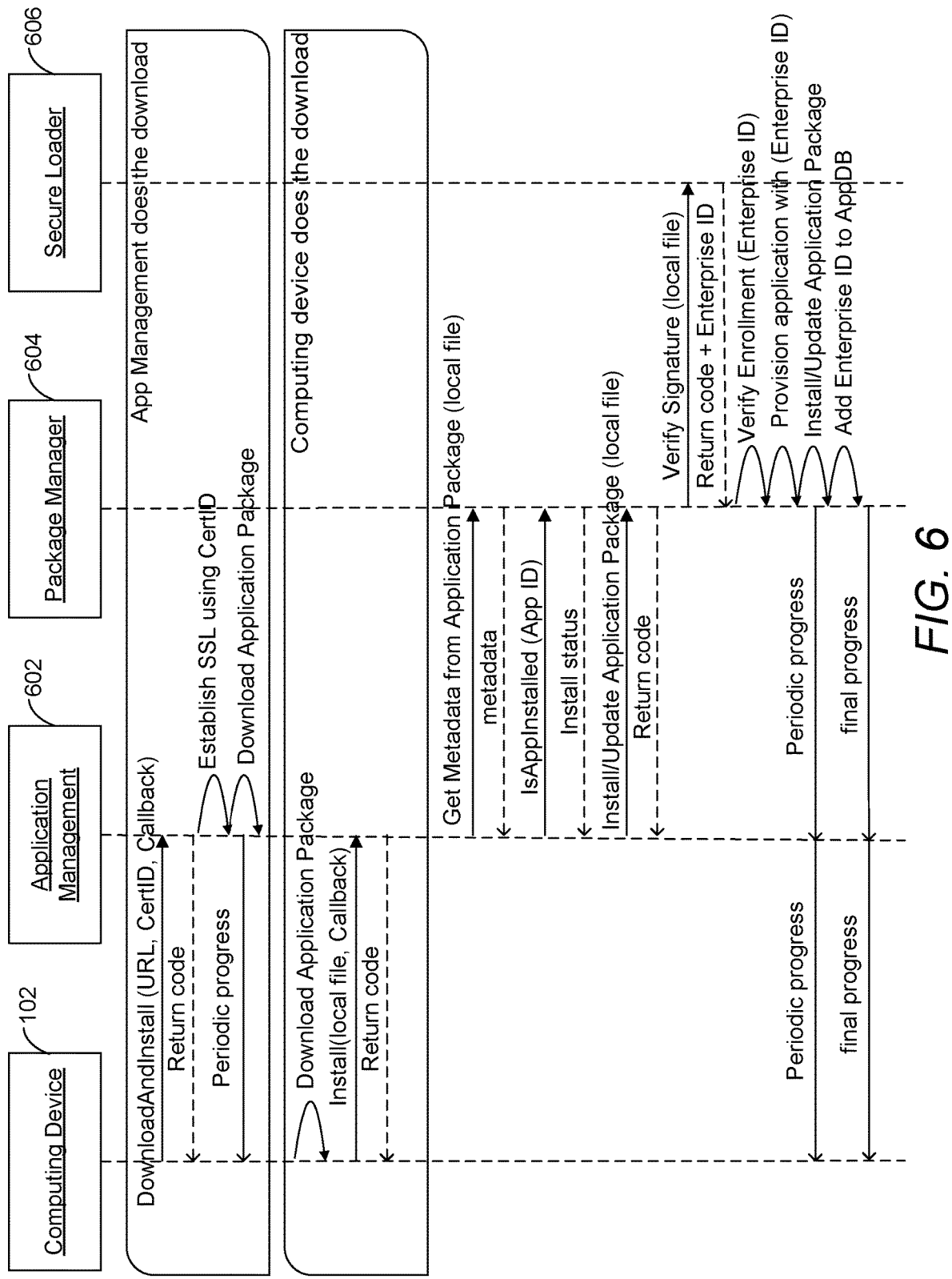
FIG. 6 is an exemplary sequence diagram illustrating installation or update of an application package on the computing device.

Referring next to FIG. 6, an exemplary sequence diagram illustrates installation or update of the applications on the computing device 102. An application management 602 component downloads an application package based on a DownloadAndinstall request, or other similar request, from the computing device 102 and a code is returned to the computing device 102. The application management 602 component establishes a secure sockets layer (SSL), for example, using a certificate identifier. The periodic progress of the download is communicated to the computing device 102. The application package is then downloaded at the computing device 102. The computing device 102 further requests installation of the application and a code is returned to the computing device 102.

The application management 602 component requests metadata from the application package. The metadata is provided to the application management 602 component by a package manager 604. The application management 602 component then checks whether the applications associated with the application package are installed, via a function call such as IsAppinstalled. In response, the install status of the application is returned. Based on the install status, installation or update of the application package is requested by the application management 602 component and a return code is provided. The package manager 604 verifies the signature of the files in the application package with a secure loader 606 (executed on the computing device 102). Verification returns a code and the enterprise identifier.

The package manager 604 verifies enrollment of the enterprise 104 by matching the returned enterprise identifier with the enterprise identifier from the application package. The application is provisioned if the enterprise identifiers match. For example, installation or update of the application package is performed and the periodic progress of the installation or update is communicated to the computing device 102 through the application management 602 component. The enterprise identifier is added to an application database 812. The final progress of the installation or update of the application package is communicated to the computing device 102 through the application management 602 component.

In some embodiments, the application management 602 component and the package manager 604 execute on the enterprise 104. Further, the secure loader 606 may execute on the application hub 212, or the secure loader 606 may be part of the web service 108.

Figure 7:
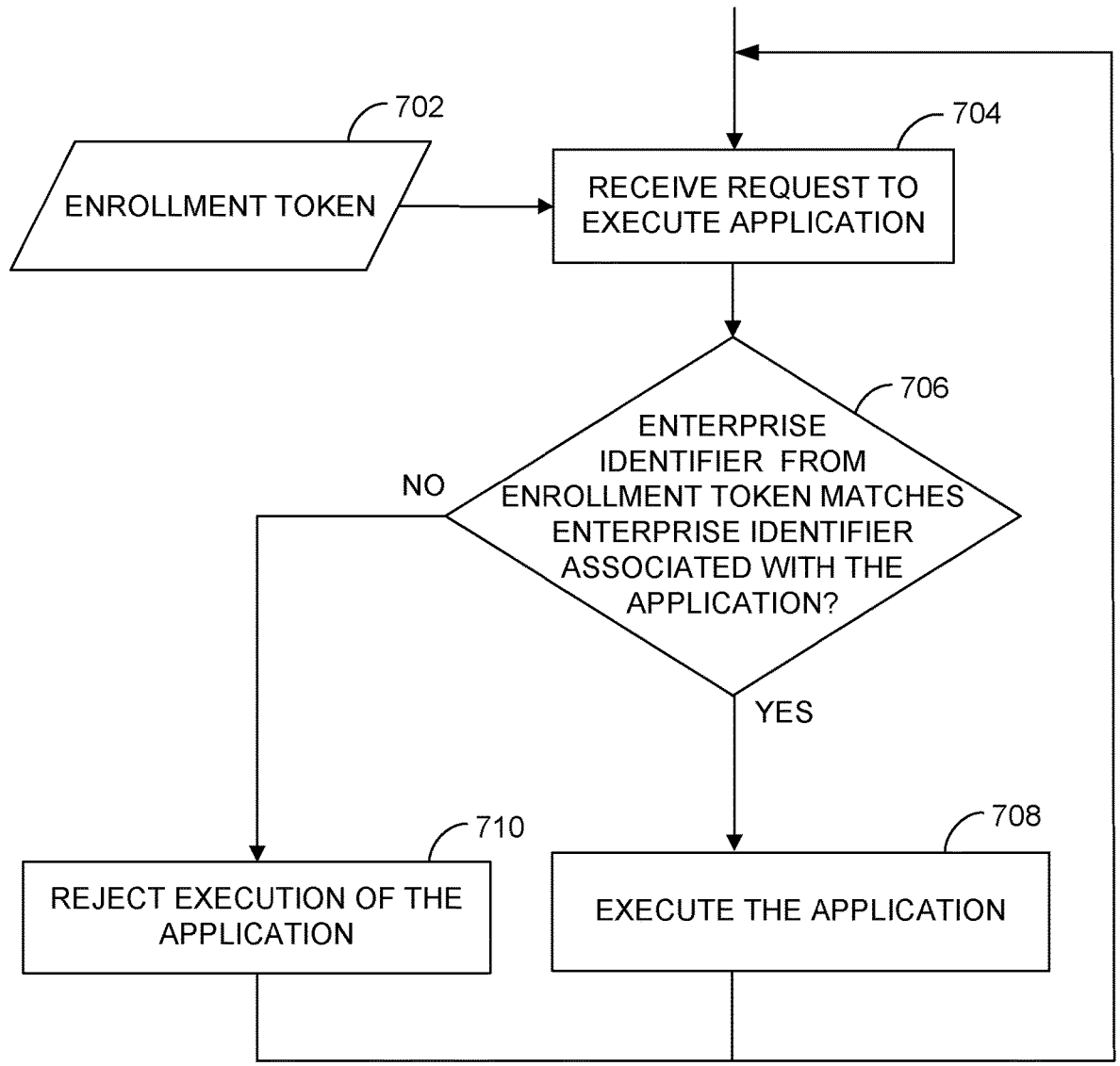
FIG. 7 is an exemplary flow chart illustrating the acceptance or rejection of application execution by the computing device.

Referring next to FIG. 7, an exemplary flow chart illustrates acceptance or rejection of application execution by the computing device 102. At 702, the computing device 102 accesses the enrollment token 312 stored in the memory area 308. At, 704, the computing device 102 receives a request to execute the application. At 706, the enterprise identifier associated with the enrollment token 312 is matched with the enterprise identifier in the application for which the request to execute is received. At 708, the application is executed if the enterprise identifiers match. Otherwise, at 710, execution of the application is rejected if the enterprise identifiers do not match.

Figure 8:
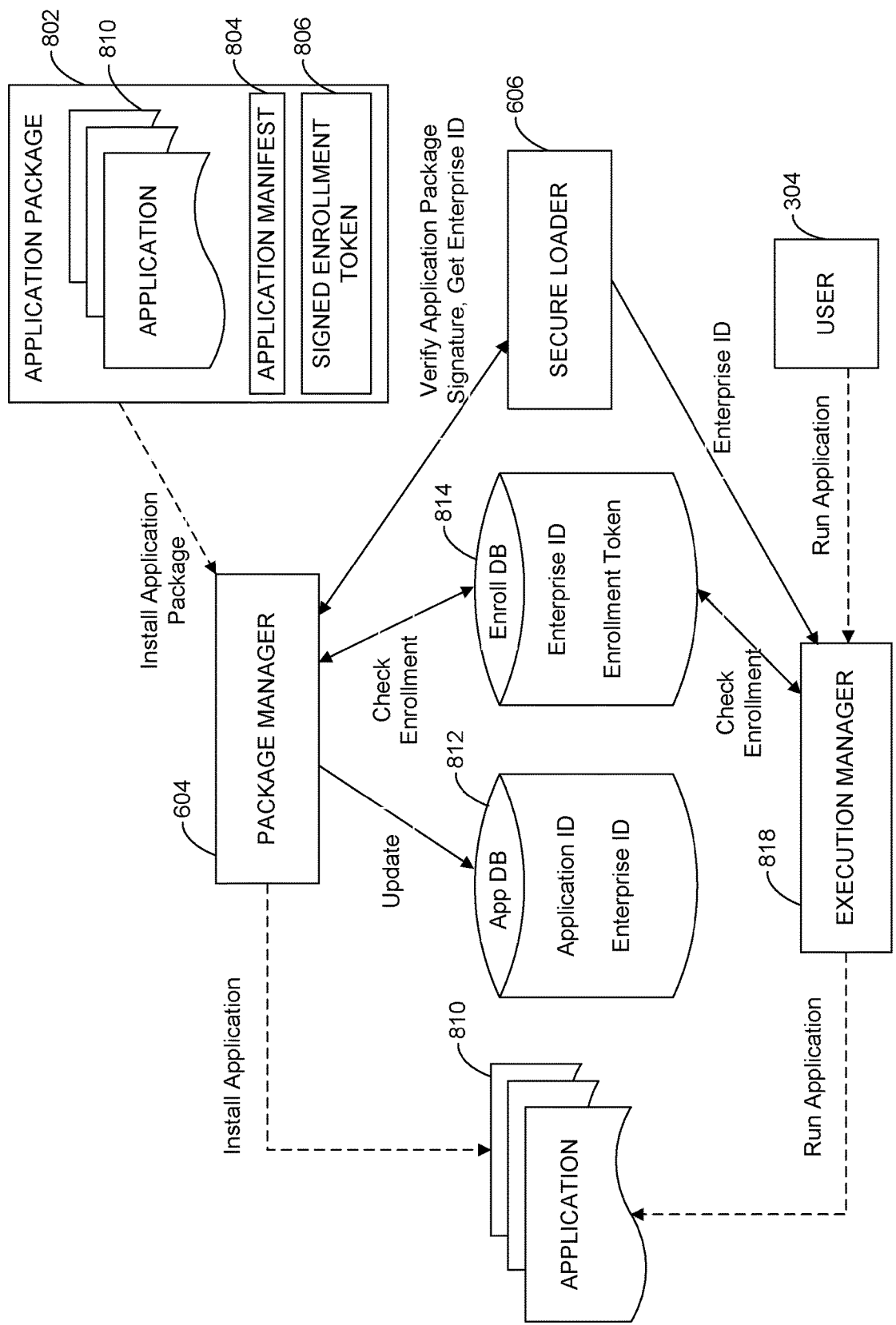
FIG. 8 is an exemplary block diagram illustrating application execution by a user of the computing device.

Referring next to FIG. 8, an exemplary block diagram illustrates application execution by the user 304 of the computing device 102. In response to the user 304 requesting execution of the application, an execution manager 818 checks enrollment status with an enrollment database 814 stored at the enterprise 104. Based on the enrollment status, the execution manager 818 may run an application 810. If the application 810 is not already installed on the computing device 102 of the user 304, the package manager 604 installs application package 802 after verification of the application package 802 with the secure loader 606. The package manager 604 obtains the enterprise identifier from the secure loader 606 and updates the application database 812. The application package 802 contains one or more applications 810, application manifest 804, and a signed enrollment token 806. The package manager 604 updates the application database 812 with the application identifier and the enterprise identifier corresponding to the applications 810 in the application package 802. Based on the verification of the application package 802, the package manager 604 installs the application 810. After installation of the application on the computing device 102, the user 304 may run the application through the execution manager 818.

Figure 9:
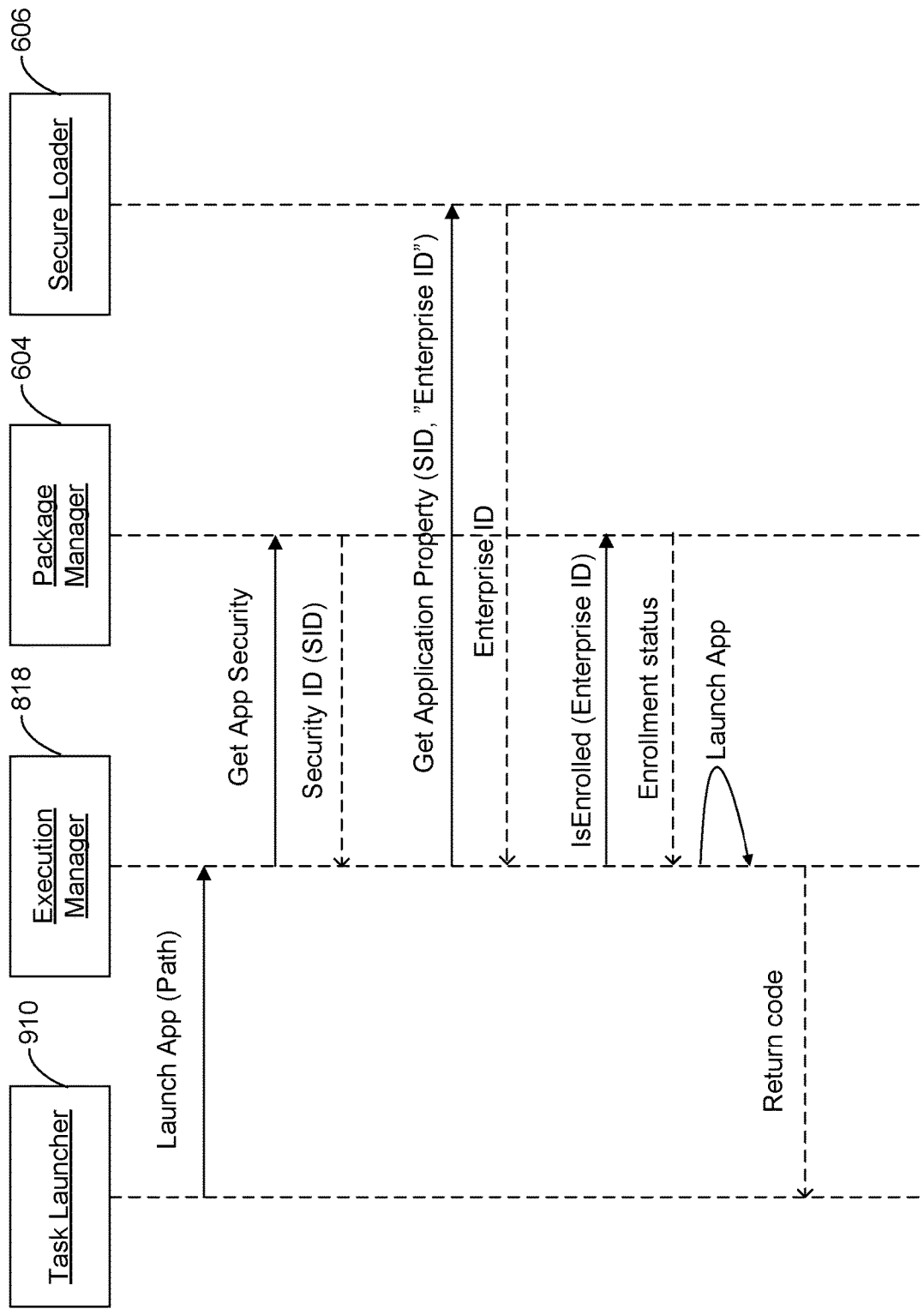
FIG. 9 is an exemplary sequence diagram illustrating launch of the application.

Referring next to FIG. 9, the exemplary sequence diagram illustrates launching the application. A task launcher 910 launches the application and the execution manager 818 requests an application security identifier. The package manager 604 returns the security identifier. The security identifier is associated with the application, for example. The execution manager 818 provides the enterprise identifier along with the security identifier to the secure loader 606. The secure loader 606 returns the enterprise identifier if the security identifier is found to be valid by the secure loader 606. The execution manager 818 checks with the package manager 604 if the enterprise identifier is enrolled. Based on the returned enrollment status, the application is launched and a code is returned to the task launcher 910. The returned code identifies the launch status of the application (e.g., whether or not the application launch is successful).

Figure 10:
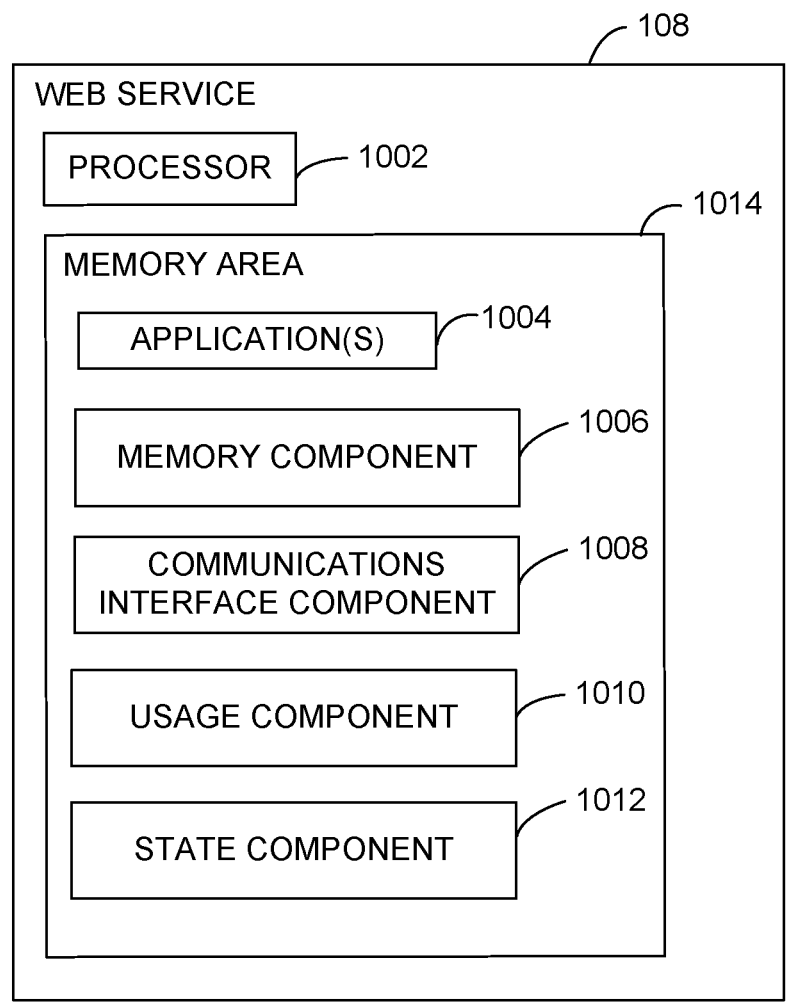
FIG. 10 is an exemplary block diagram illustrating a web service with executable components and applications.

Referring next to FIG. 10, an exemplary block diagram illustrates the web service 108 including a processor 1002 and executable components and applications 1004 stored in a memory area 1004. In some embodiments, the web service 108 is implemented by a computing device, such as the computing device 102.

The memory area 1014 further stores one or more computer-executable components. Exemplary components include a memory component 1006, a communications interface component 1008, a usage component 1010, and a state component 1012. The memory component 1006, when executed by the processor 1002 associated with the web service 108, causes the processor 1002 to access an account state associated with the enterprise 104. The account state defines access by the computing devices 102 to applications associated with the enterprise 104. The account state is, for example, enabled, revoked, disabled, and/or suspended. In some embodiments, the account state is valid for a predetermined time period (e.g. one month, one year, etc.). For example, the account state may be based on a subscription by the enterprise 104 to at least one of the applications 1004.

The processor 1002 includes any quantity of processing units, and is programmed to execute computer-executable instructions for implementing aspects of the disclosure. The instructions may be performed by the processor 1002 or by multiple processors executing within the web service 108, or performed by a processor external to the web service 108. In some embodiments, the processor is programmed to execute at least some instructions such as those illustrated in the figures (e.g., FIG. 12). In some embodiments, the processor 1002 represents an implementation of analog techniques to perform the operations described herein. For example, the operations may be performed by an analog computing device and/or a digital computing device.

The communications interface component 1008, when executed by the processor 1002 associated with the web service 108, causes the processor 1002 to receive from at least one of the computing devices 102, a report describing installation and usage by the computing device 102 of one or more of the applications (e.g., applications 1004 downloaded by the computing device 102). The report includes the enterprise identifier associated therewith. In some embodiments, the report includes a device identifier associated with the computing device 102.

In some embodiments, the communications interface component 1008 includes a network interface card and/or computer-executable instructions (e.g., a driver) for operating the network interface card. Communication between the computing device 102 and the web service 108 may occur using any protocol or mechanism over any wired or wireless connection as would be recognized by one skilled in the art.

In some embodiments, the communications interface is operable with short range communication technologies such as by using near-field communication (NFC) tags.

The usage component 1010, when executed by the processor 1002 associated with the web service 108, causes the processor 1002 to compare the report received by the communications interface component 1008 with the account state accessed by the memory component 1006. The state component 1012, when executed by the processor 1002 associated with the web service 108, causes the processor 1002 to modify the account state of the enterprise 104 based on the comparison performed by the usage component 1010. In some embodiments, the state component 1012 modifies the account state by suspending access by the computing device 102 to at least one of the one or more applications.

In some embodiments, the state component 1012 modifies the account state by revoking access by the computing device 102 to at least one of the applications. In another embodiment, the state component 1012 modifies the account state of the enterprise 104 by limiting access to one or more of the applications by the computing device 102, limiting access to one or more of the applications by selected users of the computing device 102, and/or limiting access to a subset of one or more of the applications by the computing device 102. For example, some of the applications may remain executable by the computing device 102 whereas some other applications may no longer be executable. In another example, each of the applications associated with the enterprise 104 is allowed to execute, or none of the applications associated with the enterprise 104 are allowed to execute. If the enterprise 104 is no longer valid, then each application associated with the enterprise 104 is prevented from executing.

Operation of the computer-executable components illustrated in FIG. 10 is further described with reference to FIG. 11A and FIG. 11B below.

Figures 11A, 11B:
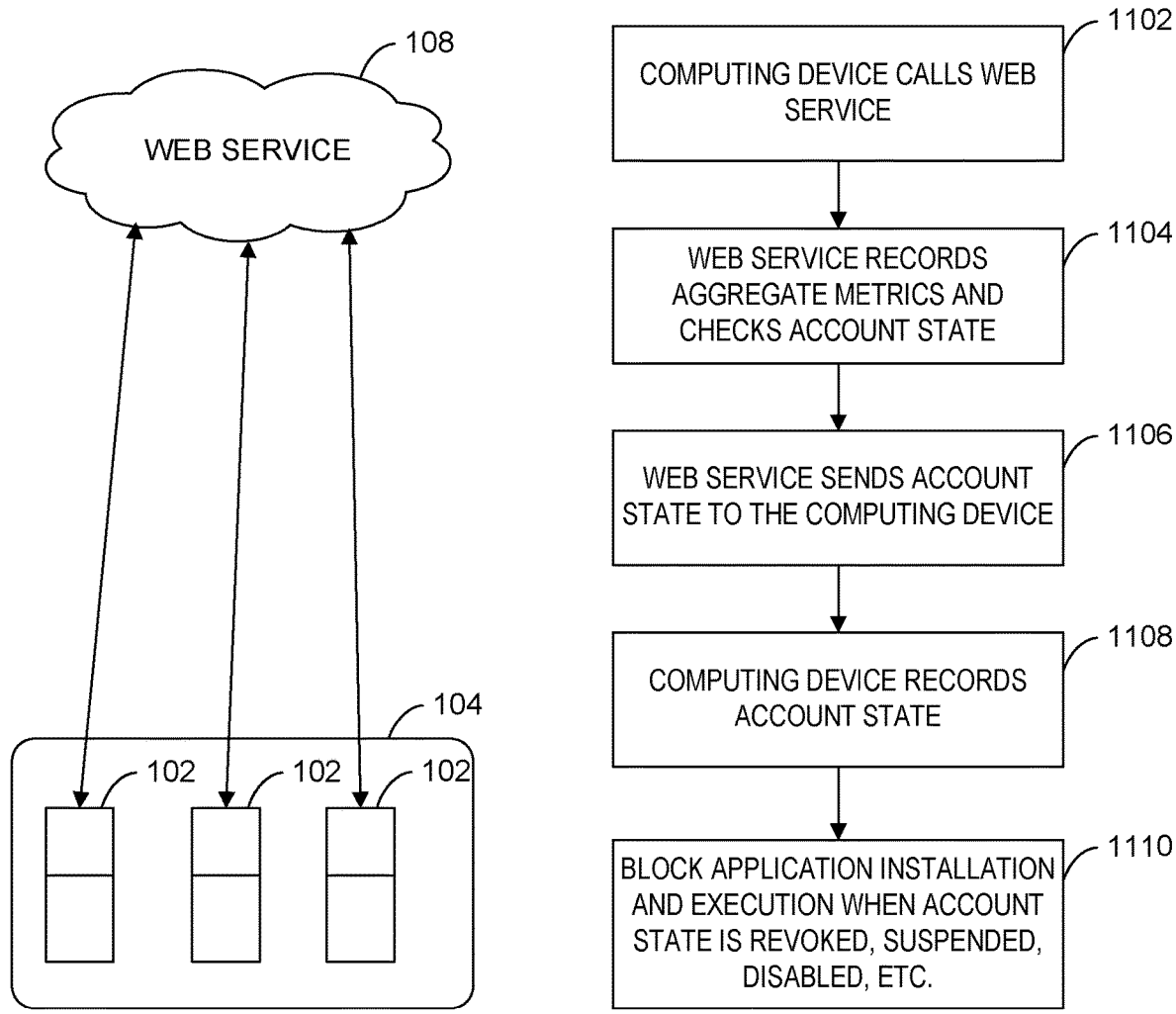
FIG. 11A is an exemplary block diagram illustrating the web service checking an account state of the computing device(s).
FIG. 11B is an exemplary flow chart illustrating operations for checking an account state of the computing device(s) by the web service.

Referring next to FIG. 11A, the web service 108 communicates with each of the computing devices 102 in a particular enterprise 104. For example, the web service 108 may periodically and/or intermittently send requests to the computing devices 102 for information related to the installation and usage of the applications 310. Alternatively or in addition, the computing devices 102 may send periodic and/or intermittent reports to the web service 108 describing the installation and usage of the applications 310. In this manner, the web service 108 is able to check the account state of the enterprise 104 and/or computing devices 102 associated with the enterprise 104.

Referring next to FIG. 11B, an exemplary flow chart illustrates operations for checking the account state of the computing device 102. In the example of FIG. 11B, the operations may be performed by any computing devices, such as the computing devices 102 and the web service 108. At 1102, the computing device 102 calls, or otherwise reports to, the web service 108. For example, the web service 108 is updated with usage information by the computing device 102. At 1104, the web service 108 records the usage information (e.g., aggregate metrics) received from the computing device 102 and checks the account state corresponding to the enterprise 104 associated with the computing device 102. The usage information corresponds to, for example, network resource usage, battery resource usage, computing resource usage, and/or billing resource usage. For example, if the usage information satisfies usage restrictions, limits, or other criteria (e.g., defined by the application hub 212, web service 108, enterprise 104, or other entity), the account state indicates that the computing device 102 is "enabled." As another example, if the usage information contradicts the usage restrictions (e.g., violations exceed a threshold or other criteria), the account state may indicate that access by the computing device 102 (and/or enterprise 104) to the applications is revoked, disabled, suspended, etc. For example, access by the computing device 102 may be suspended if the computing device 102 does not check-in with the web service 108 for a predetermined time period (e.g., three days). In some embodiments, the enterprise 104 account may be suspended or revoked due to a quantity of violations, by the computing devices 102 of the enterprise 104, exceeding a threshold. At that point, the enterprise 104 may re-enroll with the web service 108 to change the account state and re-enable the computing devices 102.

At 1106, the web service 108 sends the determined account state to at least the computing device 102 (e.g., as a notification), which records the account state at 1108 and performs operations based on the account state. For example, the installation and/or execution of one or more of the applications 310 may be blocked at 1110 when the account state is anything other than "enabled." Alternatively or in addition, rather than blocking installation or execution, the computing device 102 may only be able to install and/or execute reduced versions of the applications 310 (e.g., demo or preview versions), or versions of the applications 310 that use less resources.

In some embodiments, the web service 108 may send a notification to each of the computing devices 102 in the enterprise 104 when there has been a change in the account state that affects these other computing devices 102. In such embodiments, for example, each of the affected computing devices 102 has similar access to the applications. It is contemplated, however, that different computing devices 102 may have differing access to the applications associated with the enterprise 104 in other embodiments. In such embodiments, access by some of the computing devices 102 to the applications associated with the enterprise 104 may be enabled, whereas access by other computing devices 102 associated with the enterprise 104 may be revoked, disabled, and/or suspended.

Figure 12:
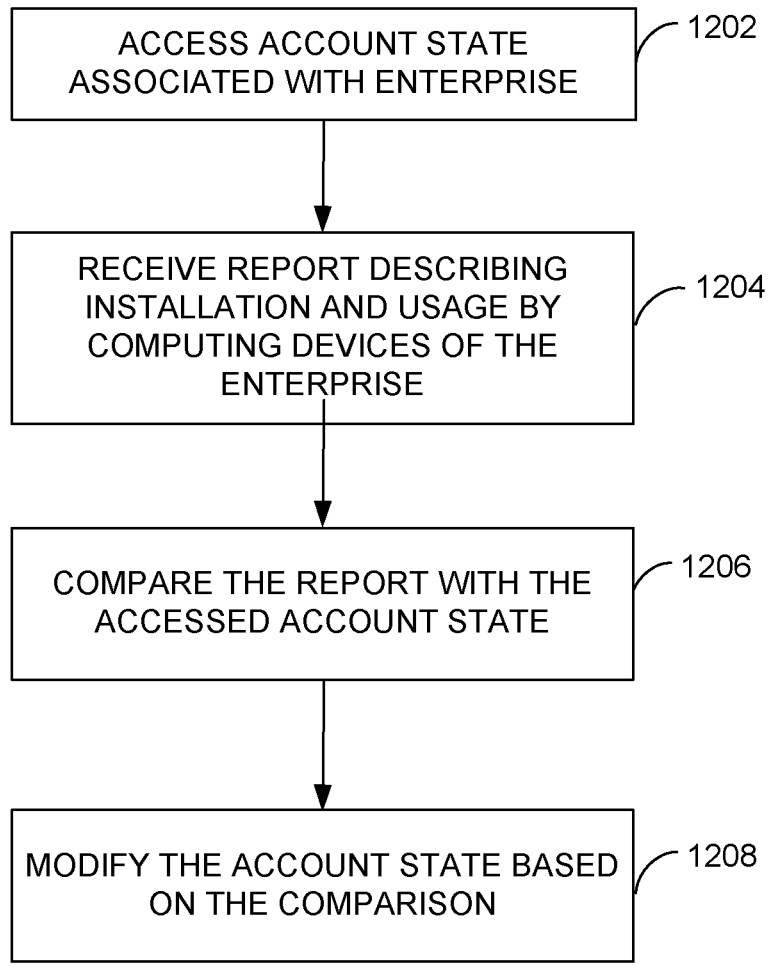
FIG. 12 is an exemplary flow chart illustrating operations for modifying an account state of the computing device.

Referring next to FIG. 12, an exemplary flow chart illustrates operations for modifying an account state of the computing device 102. While the operations illustrated in FIG. 12 are described as being performed by the web service 108, aspects of the disclosure contemplate that any device may perform the operations.

At 1202, the web service 108 accesses the account state associated with the enterprise 104. At 1204, the web service 108 receives one or more reports describing installation and usage by one or more of the computing devices 102 of the enterprise 104. At 1206, the received report is compared with the accessed account state. At 1208, the account state is modified based on the comparison. For example, the account state may be changed to any of the following states: enabled, revoked, disabled, suspended, and cancelled.

In some embodiments, the web service 108 acts as a validation service. Further, the web service 108 may execute as a cloud service, which may be the same as or differ from a cloud service associated the enterprise 104 server and/or the application hub 212.

Figure 13:
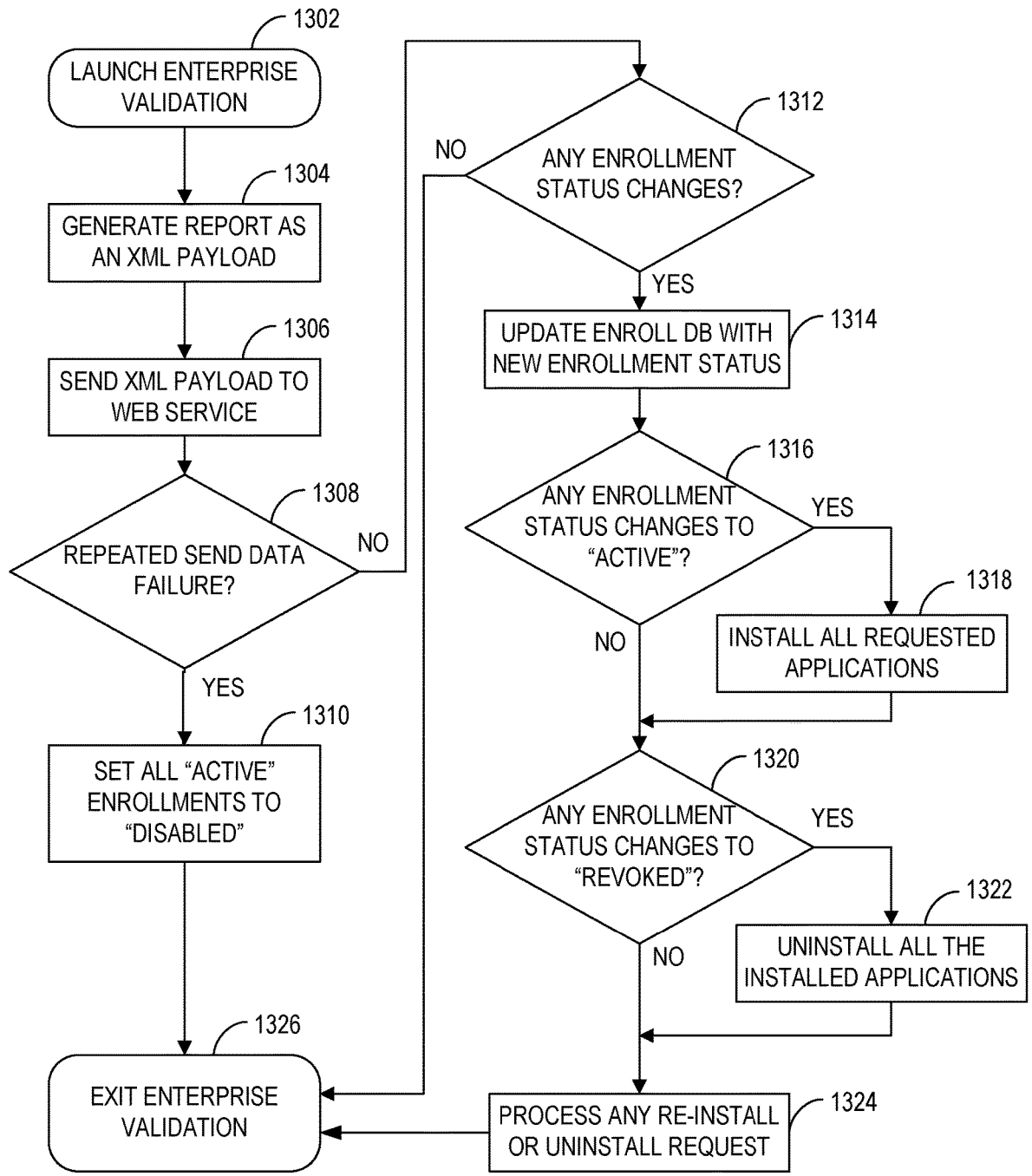
FIG. 13 is an exemplary flow chart illustrating operations for enterprise validation.

Referring next to FIG. 13, exemplary flow chart illustrates operations for validation of the enterprise 104. While the operations illustrated in FIG. 13 are described with reference to execution by the computing device 102, one or more of the operations may be performed by other entities, such as the web service 108.

At 1302, validation of the enterprise 104 is launched. Validation of the enterprise 104 may be launched in response to a request to execute or install one or more of the applications 310 by the user 304 of the computing device 102. At 1304, a report is generated, such as an extensible markup language (XML) payload. At 1306, the XML payload is sent to the web service 108. If, at 1308, there is a repeated failure to send data to the web service 108, then at 1310 all active enrollments are set to "disabled." For example, the ability of the computing device 102 to execute the applications 310 associated with any of the enterprises 104 is disabled. The repeated failures is determined when, for example, the report cannot be sent to the web service 108 after a predefined number of times (e.g., three times). The enterprise 104 validation completes at 1326 after all active enrollments have been disabled.

If there is no repeated failure to send the report at 1308, the computing device 102 waits for a determination from, for example, the web service 108, whether there has been a change in any of the enrollments at 1312. For example, the computing device 102 is notified whether an account state of the computing device 102 and/or any of the enterprises 104 has changed. If there are no enrollment status changes, the enterprise 104 validation completes at 1326. Otherwise, if there is an enrollment status change, at 1314, the computing device 102 updates the enrollment database 814 with the new enrollment status.

At 1316, the computing device 102 checks whether any enrollment status has changed to "active." If any enrollment status changes to "active", any requested applications are installed at 1318 and the process continues at 1320. Otherwise, if at 1316, none of the enrollments has changed to "active", at 1320, the computing device 102 checks whether any enrollments have changed to "revoked." For the enrollments that have changed to "revoked" at 1320, then at 1322 any installed applications associated with the "revoked" enrollments are uninstalled.

After uninstalling, the process continues at 1324. However, if none of the enrollments has changed to "revoked" at 1320, then at 1324 any re-install or uninstall request is processed. At 1326, the enterprise 104 validation process completes.

Figure 14:
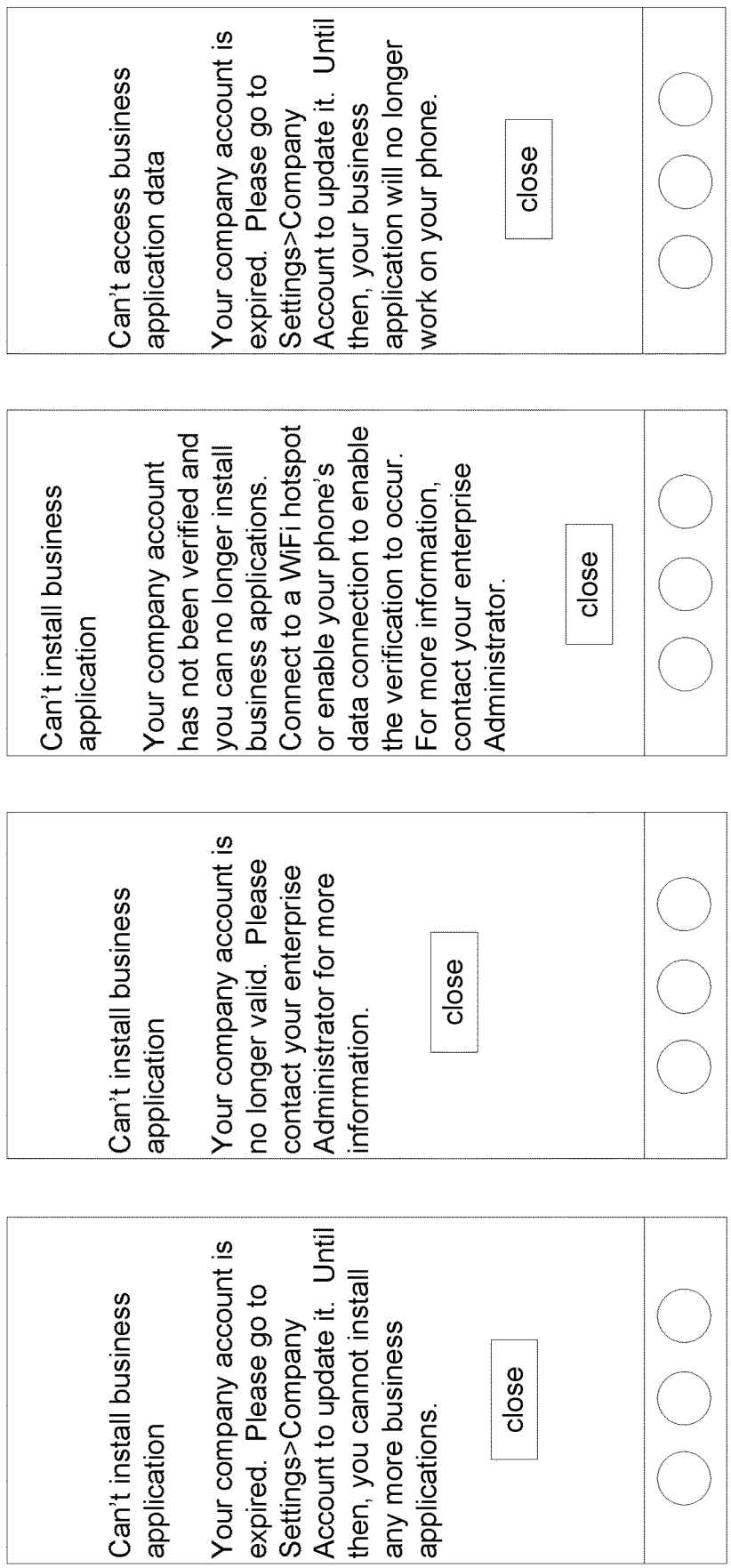
FIG. 14A through FIG. 14D illustrate exemplary user interfaces of the computing device after validation of the enterprise.

Referring next to FIG. 14A, FIG. 14B, FIG. 14C, and FIG. 14D, exemplary user interfaces illustrate the results of validation checks. The exemplary user interfaces are shown by the computing device 102, in some embodiments. For example, FIG. 14A shows that the enterprise 104 account is disabled because of certificate expiry, FIG. 14B shows that the enterprise 104 account is revoked, FIG. 14C shows that the enterprise 104 account is disabled by the web service 108 because the account cannot be verified, and FIG. 14D shows that the enterprise 104 account has been disabled.

Figure 15:
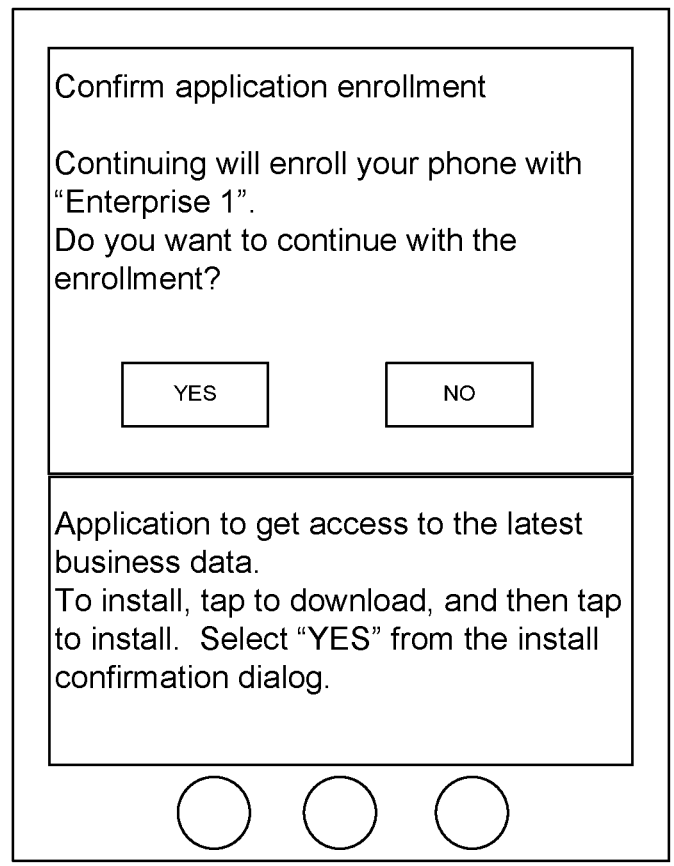
FIG. 15 illustrates an exemplary user interface showing enrollment of the application.

Referring next to FIG. 15, an exemplary user interface illustrates enrollment of the computing device 102 with the enterprise 104. If the user 304 selects "YES" from the install confirmation dialog, the computing device 102 is enrolled with the enterprise 104. For example, the enrollment token 312 for the enterprise 104 is downloaded and stored by the computing device 102.

Additional Examples

Aspects of the disclosure are capable of detecting rogue enterprises.

For example, a rogue enterprise may create an enterprise account, package applications as its own enterprise applications, and attempt to allow any device to install the applications (e.g., distribute the applications). Aspects of the disclosure are capable of detecting such a rogue enterprise by the operations described herein. For example, the web service 108 detects and revokes the enterprise account for the rogue enterprise by comparing the quantity of devices actually enrolled with the rogue enterprise with the quantity of devices requesting installation and/or execution of the packaged applications.

Aspects of the disclosure are also capable of detecting rogue users 304, such as in embodiments where a user identifier is stored in the enrollment token 312. For example, a rogue user 304 may share the enrollment token 312 for an enterprise with other users not authorized by the enterprise 104. In this example, the enterprise 104 detects the unauthorized users by authenticating the enrollment token 312 every time the enrollment token 312 is distributed to users.

In an exemplary embodiment, the user 304 is enrolled to access applications in the application database 812 when the user 304 (e.g., a new employee) configures an office account on the computing device 102. The user 304 is provided with a list of the available applications categorized into groups and tailored to the user 304, in some embodiments. Further, the user 304 may be un-enrolled when the user 304 deletes the office account from the computing device 102. In such an example, the user 304 is provided with a warning message that all installed applications and corresponding data are removed upon deletion of the office account. In other examples, the applications are automatically pushed to the user 304 without configuration by the user 304, and automatically removed upon the user 304 leaving the enterprise 104 or changing roles within the enterprise 104.

Some embodiments allow automatic application update on the computing devices 102 of the enterprise 104. For example, the enterprise 104 administrator may automatically install a new updated version of an application on the computing devices 102 of employees using an older version of the application. The installation of the update may be performed without any interaction by the employee.

In some embodiments, the application is installed on the computing device 102 when the computing device 102 is connected to a non-cellular network (e.g., Wi-Fi, universal serial bus, or other lower cost network connection).

Application installation may also be scheduled by the enterprise 104, for example, during non-peak hours or during a fixed time (e.g., overnight).

In some embodiments, the operations illustrated in FIGS. 4, 5, 7, 12, and 13 may be implemented as software instructions encoded on a computer readable medium, in hardware programmed or designed to perform the operations, or both.

For example, aspects of the disclosure may be implemented as a system on a chip or other circuitry including a plurality of interconnected, electrically conductive elements.

The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

Embodiments have been described with reference to data monitored and/or collected from the users. In some embodiments, notice may be provided to the users of the collection of the data (e.g., via a dialog box or preference setting) and users are given the opportunity to give or deny consent for the monitoring and/or collection. The consent may take the form of opt-in consent or opt-out consent.

The following exemplary XML payload illustrates how a computing device 102 enrolls with an enterprise having enterprise identifier "{96BBB293-8ED2-4DOD-8529-7B54DED7221F}":

```
<wap-provisioningdoc>
  <characteristic type="EnterpriseAppManagement">
    <characteristic type="{96BBB293-8ED2- 4DOD-8529-
    7B54DED7221F}">
      <parm name="Token" value="<binary representation of AET>"/>
      <parm name="StoreProductid" value==" {l23BB293-8ED2-4DO
      D-8529-7B54DED72123}"/>
      <parm name="StoreUri" value="http://KramericaEnt/StoreFront "/>
      <parm name="StoreName" value="Kramerica Enterprise"/>
      <parm name="CertificateSearchCriteria"
    value="CN%3dKramicara&Stores=MY%5CSystem"/>
    </characteristic>
  </characteristic>
</wap-provisioningdoc>
```

The following exemplary XML payload represents how the computing device 102 un-enrolls from an enterprise having an enterprise identifier "{96BBB293-8ED2-4DOD-8529-7B54DED7221F}":

```
<wap-provisioningdoc>
  <characteristic type="EnterpriseAppManagement">
    <nocharacteristic type="{96BBB293- 8ED2-4DOD-8529-
    7B54DED7221F}"/>
  </characteristic>
</wap-provisioningdoc>
```

In some embodiments, at least a portion of the functionality described herein as being performed by the enterprise 104 may be performed by another entity, such as the application hub 212, one or more of the computing devices 102 of the user 304, and/or the web service 108.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via touch and/or gesture input, proximity input (such as by hovering), and/or via voice input.

Embodiments of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types.

Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for managing access by the mobile computing device 102 to the applications associated with the enterprise 104 via the enrollment token.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for managing execution of applications associated with an enterprise, said system comprising:
   a mobile computing device comprising:
      a memory; and
      one or more processors programmed to:
         enroll the mobile computing device with the enterprise, the enrolling authorizing the enterprise to send applications to the mobile computing device;
         upon enrolling the mobile computing device with the enterprise, receive an enrollment token from the enterprise;
         store the enrollment token in the memory;
         receive an application;
         based at least on a determination that the application is associated with the enrollment token, determine the application is associated with the enterprise that has authorization to send applications to the mobile computing device;
         determine that access to the application provided by the enterprise has been revoked, disabled or suspended; and
         based on the access to the application being revoked, disabled, or suspended, suspend access to applications associated with the enrollment token.

2. The system of claim 1, wherein the one or more processors are further programmed to:
   based on determining that the enrollment token is no longer associated with the application, rejection installation of the application.

3. The system of claim 1, wherein upon an account state of the mobile computing device being re-enabled, determine the application is associated with the enterprise that has authorization to send applications to the mobile computing device; and
   install the application.

4. The system of claim 2, wherein the one or more processors are further programmed to:
   based on determining that the enrollment token is no longer associated with the application, uninstall the application.

5. The system of claim 1, wherein the processor is further programmed to:
   receive an indication that access to the application is not successful,
   based on the received indication, change a status of the enrollment token to disabled; and
   suspend access to applications associated with the enrollment token.

6. The system of claim 5, wherein the processor is further programmed to:
   based on a threshold number of attempts to access the application, change the status of the enrollment token to revoked; and
   uninstalled applications associated with the revoked enrollment token.

7. The system of claim 5 wherein the processor is further programmed to:
   based at least in part on determining that access to the applications provided by the enterprise has been changed to active, determine that the enrollment token is now associated with a second application and install the second application.

8. A method for managing execution of applications associated with an enterprise, the method comprising:
   enrolling the mobile computing device with the enterprise, the enrolling authorizing the enterprise to send applications to the mobile computing device;
   upon enrolling the mobile computing device with the enterprise, receiving an enrollment token from the enterprise;
   storing the enrollment token in the memory;
   receiving an application;
   based at least on a determination that the application is associated with the enrollment token, determine the application is associated with the enterprise that has authorization to send applications to the mobile computing device;
   determine that access to the application provided by the enterprise has been revoked, disabled or suspended; and
   based on the access to the application being revoked, disabled, or suspended, suspend access to applications associated with the enrollment token.

9. The method of claim 8, further comprising:
   based on determining that the enrollment token is no longer associated with the application, rejection installation of the application.

10. The method of claim 8, further comprising:
    wherein upon an account state of the mobile computing device being re-enabled, determining the application is associated with the enterprise that has authorization to send applications to the mobile computing device; and
    installing the application.

11. The method of claim 10, further comprising:
    based on determining that the enrollment token is no longer associated with the application, uninstall the application.

12. The method of claim 8, further comprising
    receiving an indication that access to the application is not successful,
    based on the received indication, changing a status of the enrollment token to disabled; and
    suspending access to applications associated with the enrollment token.

13. The method of claim 12, further comprising:
    based on a threshold number of attempts to access the application, change the status of the enrollment token to revoked; and
    uninstalled applications associated with the revoked enrollment token.

14. The method of claim 12, further comprising based at least in part on determining that access to the applications provided by the enterprise has been changed to active, determine that the enrollment token is now associated with a second application and install the second application.

15. One or more computer storage media having computer executable instructions that cause at least one processor to perform operations comprising:
    enrolling the mobile computing device with the enterprise, the enrolling authorizing the enterprise to send applications to the mobile computing device;
    upon enrolling the mobile computing device with the enterprise, receiving an enrollment token from the enterprise;

storing the enrollment token in the memory;
receiving an application;
based at least on a determination that the application is associated with the enrollment token, determine the application is associated with the enterprise that has authorization to send applications to the mobile computing device;
determining that access to the application provided by the enterprise has been revoked, disabled or suspended; and
based on the access to the application being revoked, disabled, or suspended, suspending access to applications associated with the enrollment token.

16. The one or more computer storage media of claim 15, wherein the computer executable instructions further cause the at least one processor to perform operations comprising:
based on determining that the enrollment token is no longer associated with the application, rejection installation of the application.

17. The one or more computer storage media of claim 16, wherein the computer executable instructions further cause the at least one processor to perform operations comprising:
upon an account state of the mobile computing device being re-enabled, determining the application is associated with the enterprise that has authorization to send applications to the mobile computing device; and
installing the application.

18. The one or more computer storage media of claim 15, wherein the computer executable instructions further cause the at least one processor to perform operations comprising based on determining that the enrollment token is no longer associated with the application, uninstall the application.

19. The one or more computer storage media of claim 15, wherein the computer executable instructions further cause the at least one processor to perform operations comprising:
receiving an indication that access to the application is not successful,
based on the received indication, changing a status of the enrollment token to disabled; and
suspending access to applications associated with the enrollment token.

20. The one or more computer storage media of claim 19, wherein the computer executable instructions further cause the at least one processor to perform operations comprising:
based on a threshold number of attempts to access the application, change the status of the enrollment token to revoked; and
uninstalled applications associated with the revoked enrollment token.

\* \* \* \* \*